(12) United States Patent
Kang (10) Patent No.: US 9,620,821 B2
(45) Date of Patent: Apr. 11, 2017

(54) RECHARGEABLE LITHIUM BATTERY (71) Applicant: SAMSUNG SDI CO., LTD., Yongin-si, Gyeonggi-do (KR)

(72) Inventor: Seon-Yeong Kang, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 89 days.

(21) Appl. No.: 14/098,460

(22) Filed: Dec. 5, 2013

(65) Prior Publication Data

US 2015/0056485 A1 Feb. 26, 2015

(30) Foreign Application Priority Data

Aug. 26, 2013 (KR) .................. 10-2013-0101309

(51) Int. Cl.
*H01M 10/42* (2006.01)
*H01M 2/16* (2006.01)
*H01M 10/052* (2010.01)
*H01M 10/058* (2010.01)

(52) U.S. Cl.
CPC ..... *H01M 10/4235* (2013.01); *H01M 2/1646* (2013.01); *H01M 2/1653* (2013.01); *H01M 2/1686* (2013.01); *H01M 10/052* (2013.01); *H01M 10/058* (2013.01); *H01M 2/1673* (2013.01); *Y02P 70/54* (2015.11)

(58) Field of Classification Search
None
See application file for complete search history.

(56) References Cited

U.S. PATENT DOCUMENTS

| 5,741,608 A | 4/1998 | Kojima et al. |
| 6,277,514 B1 * | 8/2001 | Ying ............ H01M 2/16 429/129 |
| 7,604,895 B2 | 10/2009 | Kim et al. |
| 7,695,857 B2 | 4/2010 | Min et al. |

(Continued)

FOREIGN PATENT DOCUMENTS

| EP | 1 115 166 A1 | 7/2001 |
| JP | 2005-259639 A | 9/2005 |

(Continued)

OTHER PUBLICATIONS

U.S. Appl. No. 13/920,505, filed Jun. 2013, Lee; Joo-Sung.*

(Continued)

*Primary Examiner* — Patrick Ryan
*Assistant Examiner* — Christopher Domone
(74) *Attorney, Agent, or Firm* — Lewis Roca Rothgerber Christie LLP (57) ABSTRACT

A rechargeable lithium battery includes an electrode assembly including a positive electrode, a first separator, a negative electrode, and a second separator that are sequentially stacked. The first separator includes a first substrate including a first side facing the positive electrode and a second side facing the negative electrode. The second separator includes a second substrate including a third side facing the negative electrode and a fourth side facing the positive electrode. At least one of the first side to the fourth side includes an organic layer including an organic material, and at least one of the second side or the third side includes an inorganic layer including an inorganic material.

20 Claims, 5 Drawing Sheets

(56) References Cited

U.S. PATENT DOCUMENTS

| | | | |
|---|---|---|---|
| 2005/0266292 A1* | 12/2005 | Kim et al. ............... 429/34 |
| 2010/0261047 A1* | 10/2010 | Kim ................ H01M 2/0275 |
| | | | 429/144 |
| 2010/0261065 A1 | 10/2010 | Babinec et al. |
| 2013/0280583 A1 | 10/2013 | Lee et al. |

FOREIGN PATENT DOCUMENTS

| | | |
|---|---|---|
| JP | 2013-134826 A | 7/2013 |
| KR | 10-2003-0060165 A | 7/2003 |
| KR | 10-0432113 | 8/2004 |
| KR | 10-2005-0095956 A | 10/2005 |
| KR | 10-2006-0102251 A | 9/2006 |
| KR | 10-2012-0086038 A | 8/2012 |
| KR | 10-2013-0052526 | 5/2013 |

OTHER PUBLICATIONS

Extended European Search Report for Application No. EP 14 17 8749, dated Feb. 27, 2015, 5 pages.

KIPO Office Action dated Dec. 20, 2016, for corresponding Korean Patent Application No. 10-2013-0101309 (7 pages).

\* cited by examiner

RECHARGEABLE LITHIUM BATTERY

CROSS-REFERENCE TO RELATED APPLICATION

This application claims priority to and the benefit of Korean Patent Application No. 10-2013-0101309 filed in the Korean Intellectual Property Office on Aug. 26, 2013, the entire content of which is incorporated herein by reference.

BACKGROUND

1. Field

A typical rechargeable lithium battery is disclosed.

2. Description of the Related Art

A rechargeable lithium battery includes a positive electrode, a negative electrode and a separator between the positive electrode and the negative electrode.

The separator electrically insulates the space between the positive electrode and the negative electrode and includes micropores through which lithium ions move. A shut-down function of the separator prevents overheating of a battery when the battery temperature is above a predetermined temperature.

However, such a separator may not effectively prevent battery expansion during repeated cycles. Moreover, overheating of the battery may limit the separator's shut-down function and an insulation function between the positive electrode and the negative electrode.

SUMMARY

One or more aspects of embodiments of the present invention are directed towards a rechargeable lithium battery that prevents battery expansion during repeated cycles, and improves battery safety by controlling battery strength to be favorable for longitudinal compression, and thin thickness.

One embodiment provides a rechargeable lithium battery that includes an electrode assembly including a positive electrode, a first separator including a first substrate including a first side facing the positive electrode and a second side facing the negative electrode, a negative electrode, and a second separator including a second substrate including a third side facing the negative electrode and a fourth side facing the positive electrode, that are sequentially stacked, wherein at least one of the first side to the fourth side includes an organic layer including an organic material, at least one of the first side to the fourth side includes an inorganic layer including an inorganic material, the organic layer is positioned on at least one of the first side and the second side or is positioned on at least one of the third side and the fourth side, and the inorganic layer is positioned on at least one of the second side and the third side.

The organic layer may be positioned on at least one of the third side and the fourth side, and the inorganic layer may be positioned on the third side.

The organic layer may be positioned on at least one of the third side and the fourth side, and the inorganic layer may be positioned on the first side and the third side.

The organic layer may be positioned on at least one of the third side and the fourth side, and the inorganic layer may be positioned on the second side and the third side.

The organic layer may be positioned on at least one of the third side and the fourth side, and the inorganic layer may be positioned on the second side and the fourth side.

The first substrate and the second substrate may each include pores having a size of about 0.01 μm to about 1 μm.

The first substrate and the second substrate may each comprise a polyolefin-based resin.

The first substrate and the second substrate may each have a thickness of about 6 μm to about 25 μm.

The organic material may comprise particles comprising polyolefin, polyolefin derivative, polyolefin wax, an acryl-based polymer, or a combination thereof. A weight average molecular weight of the organic material may be about 300 to about 10,000 g/mol, and a particle size of the organic material may be from about 100 nm to about 5 μm.

When the organic layer is positioned on at least one of the first side and the second side, the organic material may be in an amount of about 1 part by weight to about 80 parts by weight based on 100 parts by weight of the first substrate, and when the organic layer is positioned on at least one of the third side and the fourth side, the organic material may be in an amount of about 1 part by weight to about 80 parts by weight based on 100 parts by weight of the second substrate.

The organic layer may have a thickness of about 1 μm to about 6 μm.

The organic layer may further include a binder that is different from the organic material, and the binder may include a styrene-butadiene rubber (SBR), carboxylmethyl cellulose (CMC), polyvinylidene fluoride (PVdF), a polyvinylidene fluoride-hexafluoropropylene (PVdF-HFP) copolymer, ethylene vinylacetate (EVA), hydroxyethyl cellulose (HEC), polyvinyl alcohol (PVA), polyvinylbutyral (PVB), an ethylene-acrylic acid copolymer, acrylonitrile, a vinyl acetate derivative, polyethylene glycol, an acryl-based rubber, or a combination thereof.

The inorganic material may include $SiO_2$, $Al_2O_3$, $Al(OH)_3$, $AlO(OH)$, $TiO_2$, $BaTiO_2$, $ZnO_2$, $Mg(OH)_2$, $MgO$, $Ti(OH)_4$, $ZrO_2$, aluminum nitride, silicon carbide, boron nitride, or a combination thereof, and the inorganic material may have a particle size of about 0.1 μm to about 5 μm.

When the inorganic layer is positioned on at least one of the first side and the second side, the inorganic material may be in an amount of about 20 parts by weight to about 200 parts by weight based on 100 parts by weight of the first substrate, and when the inorganic layer is positioned on at least one of the third side and the fourth side, the inorganic material may be in an amount of about 20 parts by weight to about 200 parts by weight based on 100 parts by weight of the second substrate.

The inorganic layer may have a thickness of about 0.5 μm to about 7 μm.

The inorganic layer may further include a binder.

Other embodiments are included in the following detailed description.

Provided is a rechargeable lithium battery that prevents battery expansion during repeated cycles, and has improved safety by controlling battery strength to be favorable for longitudinal compression, and thin thickness.

DETAILED DESCRIPTION

Hereinafter, embodiments are described in detail. However, these embodiments are exemplary, and this disclosure is not limited thereto. Further, the use of "may" when describing embodiments of the present invention refers to "one or more embodiments of the present invention."

Figure 1:
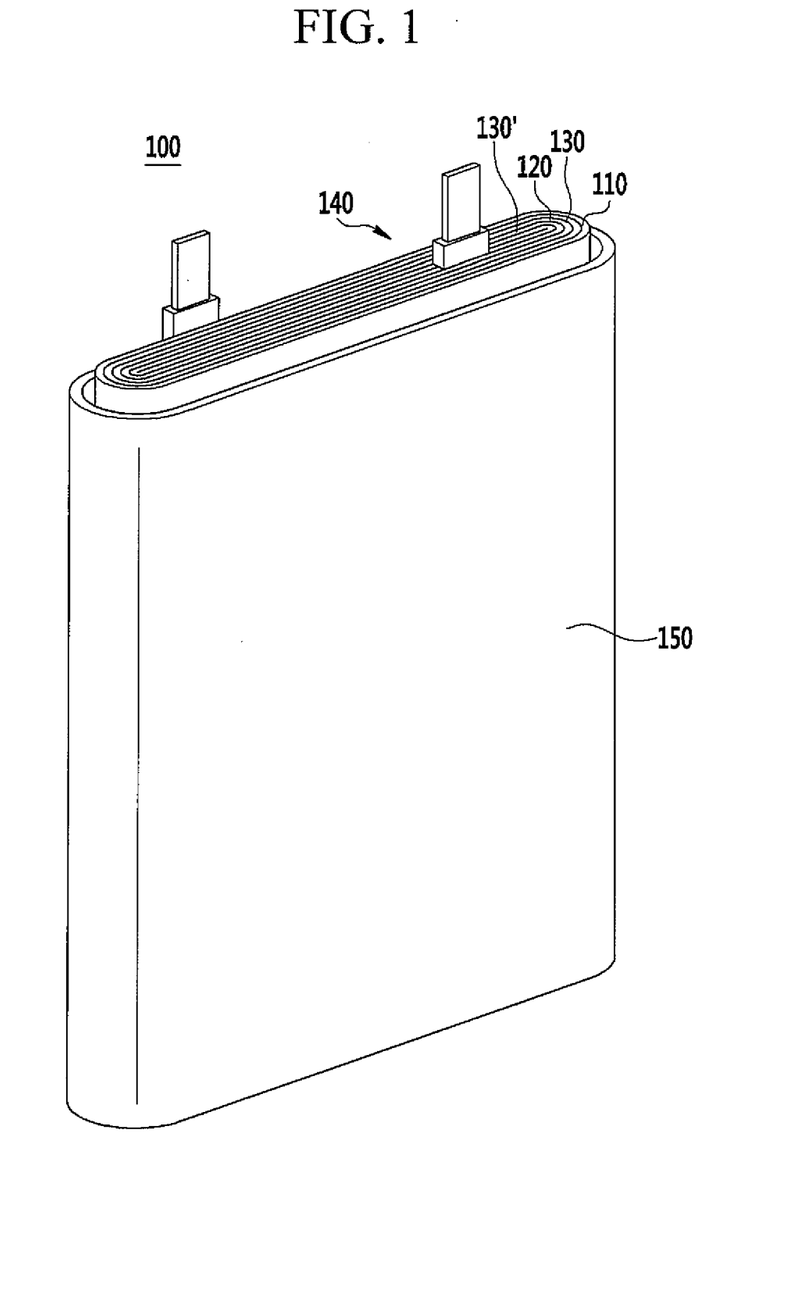
FIG. 1 is an exploded perspective view showing a rechargeable lithium battery according to one or more embodiments.

A rechargeable lithium battery according to one embodiment is described referring to FIG. 1.

FIG. 1 is an exploded perspective view of a rechargeable lithium battery according to one embodiment. The rechargeable lithium battery according to one embodiment is for example a prismatic battery, but the present invention is not limited thereto, and may be applied to various batteries such as a lithium polymer battery, a cylindrical battery, and the like.

Referring to FIG. 1, a rechargeable lithium battery 100 according to one embodiment includes an electrode assembly 140 including a positive electrode 110, a first separator 130, a negative electrode 120, and a second separator 130' that are sequentially stacked, and a case 150 housing the electrode assembly 140. The first separator 130 and the second separator 130' interposed between the positive electrode 110 and the negative electrode 120 may be impregnated with an electrolyte (not shown).

The electrode assembly according to one embodiment may be formed by spirally winding the positive electrode and the negative electrode, and two separators. A first separator interposed between the positive and the negative electrodes may not have adherence, and a second separator interposed between the positive and the negative electrodes may have adherence. When the separator having adherence and the separator having no adherence are used together, a thin rechargeable lithium battery may be obtained and may resist expansion as a charge and discharge cycle repeats, and battery safety may be improved by optimizing battery strength for a longitudinal compression. Safety of a rechargeable lithium battery, for example, explosion prevention due to overheating of the battery cell, may be improved by further decreasing the strength of the battery cell to obtain a better longitudinal compression.

In some embodiments, the first separator may include a first substrate including a first side facing the positive electrode and a second side facing the negative electrode, and the second separator may include a second substrate including a third side facing the negative electrode and a fourth side facing the positive electrode. At least one inorganic material and at least one organic material may be coated on at least one of the first side to the fourth side, and herein, the inorganic material and the organic material may be coated on the same side or different sides from each other.

The side of a separator coated with the organic material may have adherence, and the sides of separators coated with the inorganic material or coated with neither inorganic material nor organic material may have no adherence. According to one embodiment, the organic material may be coated on at least one of the first side and the second side or on at least one of the third side and the fourth side to spirally wind an electrode assembly including one separator having adherence and another separator having no adherence. In other words, one side of one of the first separator and the second separator may be coated with the organic material.

In addition, the inorganic material may be coated on at least one of the first side to the fourth side, and according to one embodiment, on at least one of the second side and the third side. In other words, the inorganic material may be coated on one side of a substrate facing a negative electrode in each separator. In some embodiments, when the inorganic material is coated on one side of a substrate facing a negative electrode, an amount of an electrolyte that can be included in the side of the separator on which the inorganic material is coated, is relatively increased and the electrolyte is more readily supplied into a negative electrode, thus decreasing reaction resistance and preventing thickness expansion due to a side-reaction product and the like.

Structures of a rechargeable lithium battery according to one embodiment are described in more detail referring FIGS. 2 to 5. FIGS. 2 to 5 are examples for explaining the present invention, but the present invention is not limited thereto.

Figure 2:
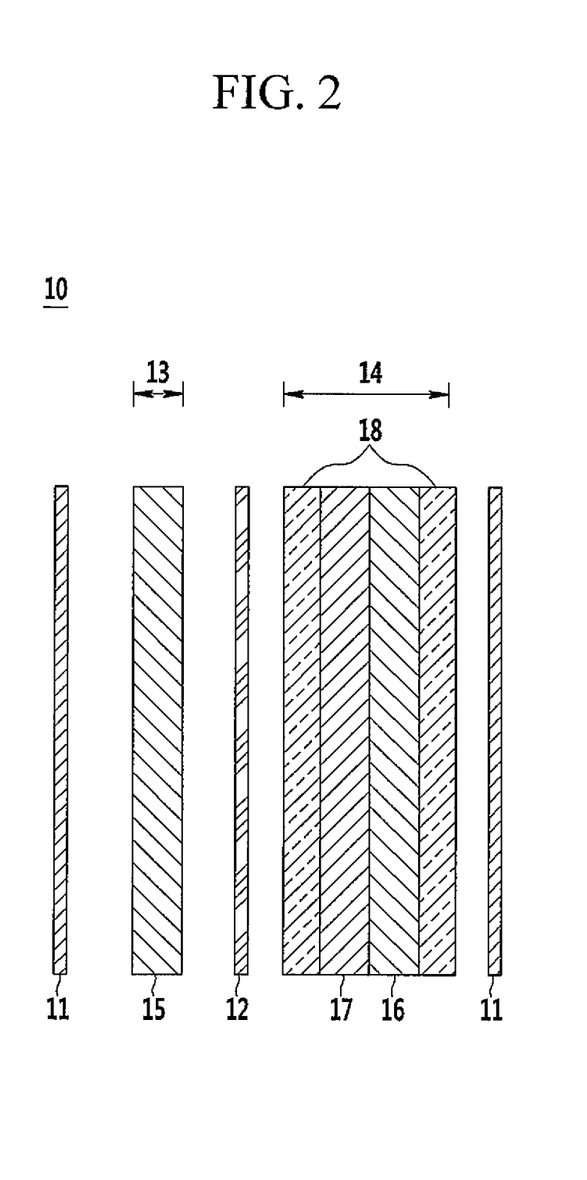
FIG. 2 is a cross-sectional exploded view showing a structure of a rechargeable lithium battery according to one embodiment.

FIG. 2 is a cross-sectional view showing a structure of a rechargeable lithium battery according to one embodiment.

Referring to FIG. 2, a rechargeable lithium battery 10 according to one embodiment includes an electrode assembly including a positive electrode 11, a first separator 13, a negative electrode 12 and a second separator 14 that are sequentially stacked. The first separator 13 includes a first substrate 15 including a first side facing the positive electrode 11 and a second side facing the negative electrode 12, and the second separator 14 includes a second substrate 16 including a third side facing the negative electrode 12, and a fourth side facing the positive electrode 11. Herein, the second separator 14 may further include an inorganic layer 17 positioned on the third side and including an inorganic material, and organic layers 18 positioned on the third side and the fourth side and including an organic material. On the third side, the inorganic layer 17 and the organic layer 18 on the inorganic layer 17 may coexist.

According to this structure, the first separator 13 coated with no organic material may have no adherence, and the second separator 14 coated with an organic material may have adherence. When the separator having adherence is used with another separator having no adherence, a thin rechargeable lithium battery may be formed and effectively prevented from expanding as a charge and discharge cycle repeats, and safety of the resulting rechargeable lithium battery may thus be improved by decreasing battery strength, so that the battery may be advantageous for a longitudinal compression.

In addition, the inorganic layer 17 including the inorganic material is positioned on the third side facing the negative electrode 12, so that an electrolyte may be sufficiently supplied to a negative electrode. As a result, reaction resistance may decrease and thickness expansion may be prevented due to a side-reaction product and the like.

Figure 3:
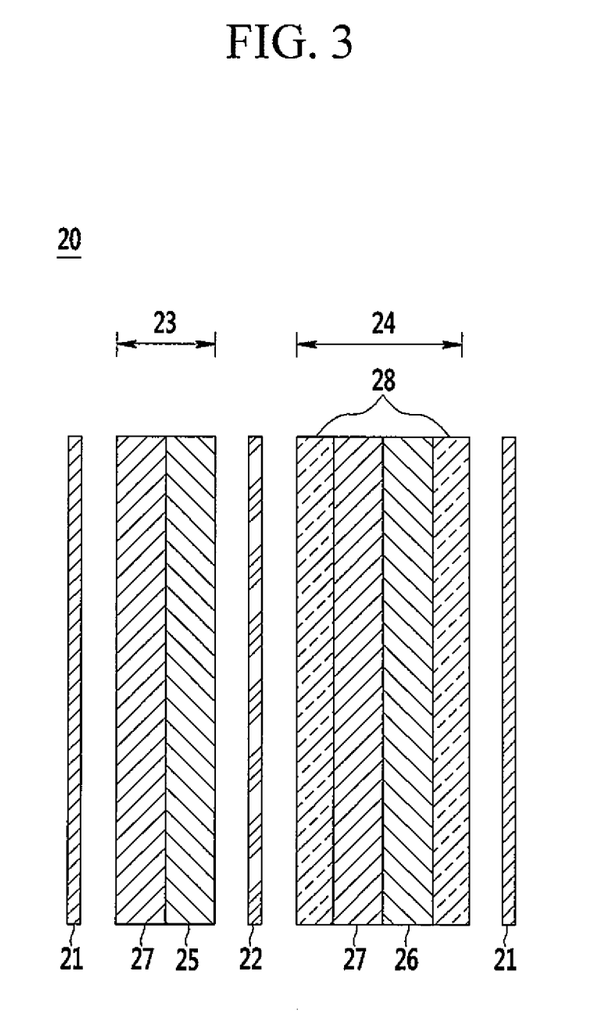
FIG. 3 is a cross-sectional exploded view showing a structure of a rechargeable lithium battery according to another embodiment.

FIG. 3 is a cross-sectional view showing a structure of a rechargeable lithium battery according to another embodiment of the present invention.

Referring to FIG. 3, a rechargeable lithium battery 20 according to one embodiment includes an electrode assembly including a positive electrode 21, a first separator 23, a negative electrode 22 and a second separator 24 that are sequentially stacked. The first separator 23 includes a first substrate 25 including a first side facing the positive electrode 21 and a second side facing the negative electrode 22, and the second separator 24 includes a second substrate 26 including a third side facing the negative electrode 22 and a fourth side facing the positive electrode 21.

Herein, the first separator 23 may further include an inorganic layer 27 positioned on the first side and including an inorganic material. In addition, the second separator 24 may include an inorganic layer 27 positioned on the third side and including an inorganic material and organic layers 28 positioned on the third and fourth sides and further including an organic material. On the third side, the inorganic layer 27 and the organic layer 28 on the inorganic layer 27 may coexist.

According to this structure, the first separator 23 coated with no organic material may have no adherence, and the second separator 24 coated with an organic material may have adherence. When the separator having adherence is used with another separator having no adherence, a thin rechargeable lithium battery may be formed and effectively prevented from expanding as a charge and discharge cycle repeats, and the safety of the resulting rechargeable lithium battery may be improved by decreasing battery strength, so that the battery may be advantageous for a longitudinal compression.

In addition, since at least one of the inorganic layers 27 respectively present on the first separator 23 and the second separator 24 is positioned on the third side facing the negative electrode 22, an electrolyte may be sufficiently supplied to a negative electrode and thus, may decrease reaction resistance of the battery and prevent thickness expansion due to a side-reaction product and the like.

Figure 4:
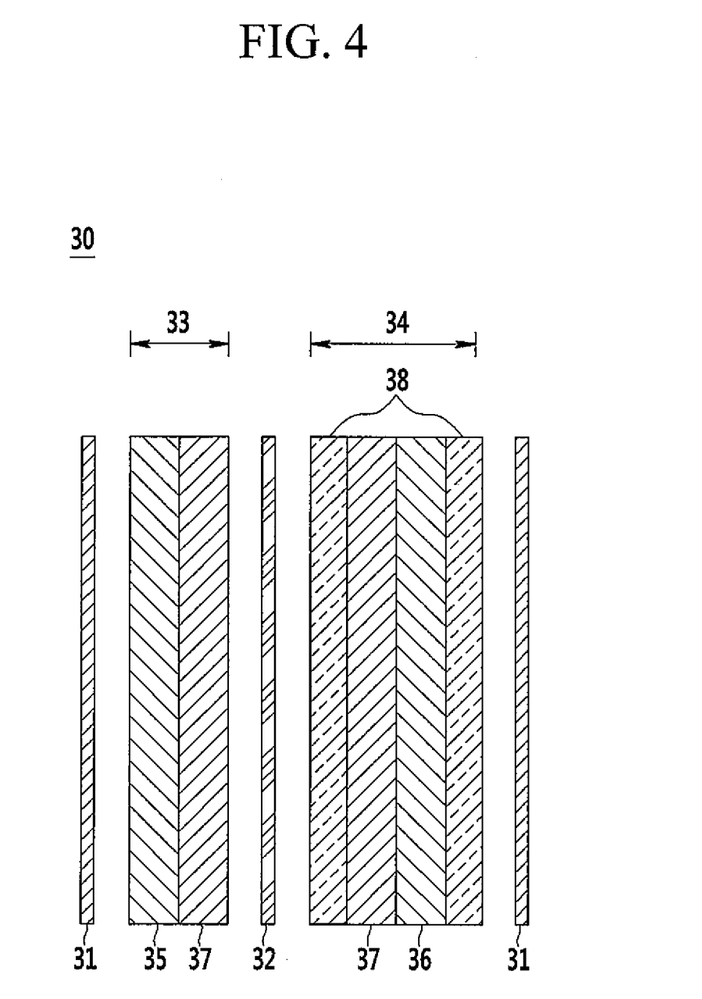
FIG. 4 is a cross-sectional exploded view showing a structure of a rechargeable lithium battery according to yet another embodiment.

FIG. 4 is a cross-sectional view showing a structure of a rechargeable lithium battery according to another embodiment.

Referring to FIG. 4, a rechargeable lithium battery 30 according to one embodiment includes an electrode assembly including a positive electrode 31, a first separator 33, a negative electrode 32 and a second separator 34 that are sequentially stacked. The first separator 33 includes a first substrate 35 including a first side facing the positive electrode 31 and a second side facing the negative electrode 32, and the second separator 34 includes a second substrate 36 including a third side facing the negative electrode 32, and a fourth side facing the positive electrode 31. Herein, the first separator 33 may further include an inorganic layer 37 positioned on the second side and including an inorganic material. In addition, the second separator 34 may include an inorganic layer 37 positioned on the third side and including an inorganic material, and organic layers 38 positioned on the third and fourth sides and further including an organic material. On the third side, the inorganic layer 37 and the organic layer 38 on the inorganic layer 37 may coexist.

According to this structure, the first separator 33 coated with no organic material may have no adherence, but the second separator 34 coated with an organic material may have adherence. When the separator having adherence is used with another separator having no adherence, a thin rechargeable lithium battery may be formed and effectively prevented from expanding as a charge and discharge cycle repeats, and the safety of the resulting rechargeable lithium battery may be improved by decreasing battery strength, so that the battery may be advantageous for a longitudinal compression.

In addition, since at least one of the inorganic layers 37 respectively present on the first separator 33 and the second separator 34 is positioned on the third side facing the negative electrode 32, an electrolyte may be sufficiently supplied to a negative electrode and thus, may decrease reaction resistance of the battery and prevent thickness expansion due to a side-reaction product and the like.

Figure 5:
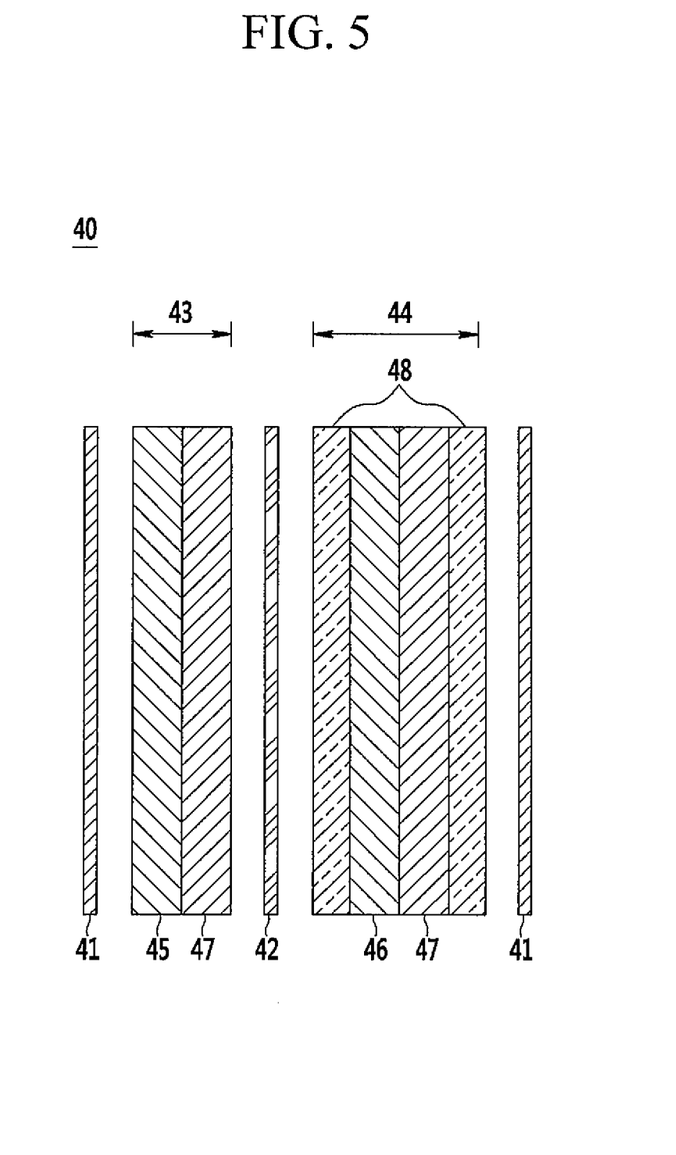
FIG. 5 is a cross-sectional exploded view showing a structure of a rechargeable lithium battery according to still another embodiment.

FIG. 5 is a cross-sectional view showing a structure of a rechargeable lithium battery according to another embodiment.

Referring to FIG. 5, a rechargeable lithium battery 40 according to one embodiment includes an electrode assembly including a positive electrode 41, a first separator 43, a negative electrode 42, and a second separator 44 that are sequentially stacked. The first separator 43 includes a first substrate 45 including a first side facing the positive electrode 41 and a second side facing the negative electrode 42, and the second separator 44 includes a second substrate 46 including a third side facing the negative electrode 42, and a fourth side facing the positive electrode 41. Herein, the first separator 43 may further include an inorganic layer 47 positioned on the second side and including an inorganic material. In addition, the second separator 44 may further include an inorganic layer 47 positioned on the fourth side and including an inorganic material and organic layers 48 positioned on the third and fourth sides and including an organic material. On the fourth side, the inorganic layer 47 and the organic layer 48 on the inorganic layer 47 may coexist.

According to this structure, the first separator 43 coated with no organic material may have no adherence, and the second separator 44 coated with an organic material may have adherence. When the separator having adherence is used with another separator having no adherence, a thin rechargeable lithium battery may be formed and effectively prevented from expanding as a charge and discharge cycle repeats, and the safety of the resulting rechargeable lithium battery may be improved by decreasing battery strength, so that the battery may be advantageous for a longitudinal compression.

In addition, since at least one of the inorganic layers 47 respectively present on the first separator 43 and the second separator 44 is positioned on the second side facing the negative electrode 42, an electrolyte may be readily supplied to a negative electrode and thus, may decrease reaction resistance of the battery and prevent thickness expansion due to a side-reaction product and the like.

The first substrate and the second substrate may each be include a polyolefin-based resin. The polyolefin-based resin may be, for example, a polyethylene-based resin, a polypropylene-based resin, or a combination thereof.

The first substrate and the second substrate may each include pores. Lithium ions may move through such pores.

The pores may have a size of about 0.01 μm to about 1 μm, in some embodiments of about 0.03 μm to about 1 μm, and in another embodiments of about 0.1 μm to about 1 μm. When the pores have a size within the range, performance and safety of a rechargeable lithium battery may be secured by preventing an internal short-circuit due to formation of lithium dendrite and minimizing movement resistance of lithium ions.

The first substrate and the second substrate may each have a thickness of about 6 μm to about 25 μm, and in some embodiments of about 7 μm to about 20 μm. When the substrate has a thickness within the range, excellent safety as well as capacity of a rechargeable lithium battery may be secured due to excellent physical characteristics.

The organic material may comprise particles including polyolefin, a polyolefin derivative, polyolefin wax, an acryl-based polymer, or a combination thereof.

A weight average molecular weight of the organic material may be from about 300 to about 10,000 g/mol, and in some embodiments from about 2,000 to about 6,000 g/mol. The particle size of the organic material may be from about 100 nm to about 5 μm, and in some embodiments from about 200 nm to about 3 μm. When the organic material has a weight average molecular weight and a particle size within these ranges, performance of a rechargeable lithium battery may be improved by minimizing movement resistance of lithium ions.

When the organic layer is positioned on at least one of the first side and the second side, the organic material may be included in an amount of about 1 part by weight to about 80 parts by weight, and in some embodiments of about 30 parts by weight to about 70 parts by weight, based on 100 parts by weight of the first substrate When the organic layer is positioned on at least one of the third side and the fourth side, the organic material may be included in an amount of about 1 part by weight to about 80 parts by weight, and in some embodiments of about 30 parts by weight to about 70 parts by weight based on 100 parts by weight of the second substrate. When the organic material is included within the amount range, battery expansion may be further prevented, during a charge and discharge cycle of the battery.

The organic layer may have a thickness of about 1 μm to about 6 μm, and in some embodiments of about 3 μm to about 6 μm. When the organic layer has a thickness within the range, a thin rechargeable lithium battery may be manufactured and also, prevented from expansion, during a charge and discharge cycle of the battery.

In addition to the organic material, the organic layer may further include a binder.

The binder may be a material that is different from the organic material. Non-limiting examples of the binder include a styrene-butadiene rubber (SBR), carboxylmethyl cellulose (CMC), polyvinylidene fluoride (PVdF), a polyvinylidene fluoride-hexafluoropropylene (PVdF-HFP) copolymer, ethylene vinylacetate (EVA), hydroxyethyl cellulose (HEC), polyvinyl alcohol (PVA), polyvinylbutyral (PVB), an ethylene-acrylic acid copolymer, acrylonitrile, a vinyl acetate derivative, polyethylene glycol, an acryl-based rubber, or a combination thereof, and in some embodiments, styrene-butadiene rubber (SBR), a mixture of the styrene-butadiene rubber (SBR) and carboxylmethyl cellulose (CMC), ethylene vinylacetate (EVA), polyvinyl alcohol (PVA), ethylene-acrylic acid copolymer, or acryl-based rubber may be used.

When the binder is included in the organic layer, the binder may be physically cross-linked with a binder present in the positive and negative electrodes and may improve adherence between separator and electrode.

The inorganic material may include $SiO_2$, $Al_2O_3$, $Al(OH)_3$, $AlO(OH)$, $TiO_2$, $BaTiO_2$, $ZnO_2$, $Mg(OH)_2$, $MgO$, $Ti(OH)_4$, $ZrO_2$, aluminum nitride, silicon carbide, boron nitride, or a combination thereof.

The inorganic material may have a particle size of about 0.1 μm to about 5 μm, and in some embodiments of about 0.3 μm to about 1 μm. When the inorganic material has a particle size within the range, performance of a rechargeable lithium battery may be secured by uniformly coating the particles on the substrate and minimizing resistance of lithium ions.

When the organic layer is positioned on at least one of the first side and the second side, the inorganic material may be included in an amount of about 20 parts by weight to about 200 parts by weight, and in some embodiments of about 80 parts by weight to about 150 parts by weight based on 100 parts by weight of the first substrate. When the inorganic layer is positioned on at least one of the third side and the fourth side, the inorganic material may be included in an amount of about 20 parts by weight to about 200 parts by weight, and in some embodiments of about 80 parts by weight to about 150 parts by weight based on 100 parts by weight of the second substrate. When the inorganic material is included within this range, the safety of a rechargeable lithium battery, for example prevention of explosion of the battery due to overheating of the battery cell, may be improved by further decreasing strength of the battery cell to obtain a better longitudinal compression.

The inorganic layer may have a thickness of about 0.5 μm to about 7 μm, and in some embodiments of about 1 μm to about 6 μm. When the inorganic layer has a thickness within the range, safety of a rechargeable lithium battery may be further improved by further decreasing strength of the battery.

In addition to the inorganic material, the inorganic layer may further include a binder.

The binder may use the same material as the binder included in the organic layer.

In some embodiments, the positive electrode includes a current collector and a positive active material layer disposed on the current collector.

The positive current collector may use aluminum, but is not limited thereto.

In some embodiments, the positive active material layer includes a positive active material.

The positive active material may be a compound (lithiated intercalation compound) capable of intercalating and deintercallating lithium, and in some embodiments may be lithium metal oxide.

The lithium metal oxide may specifically be an oxide of at least one metal selected from cobalt, manganese, nickel, and aluminum, and lithium. More specifically, the compounds represented by one of the following Chemical Formulae may be used.

$Li_aA_{1-b}X_bD_2$ (0.90≤a≤1.8, 0≤b≤0.5); $Li_aA_{1-b}X_bO_{2-c}D_c$ (0.90≤a≤1.8, 0≤b≤0.5, 0≤c≤0.05); $Li_aE_{1-b}X_bO_{2-c}D_c$ (0.90≤a≤1.8, 0≤b≤0.5, 0≤c≤0.05); $Li_aE_{2-b}X_bO_{4-c}D_c$ (0.90≤a≤1.8, 0≤b≤0.5, 0≤c≤0.05); $Li_aNi_{1-b-c}Co_bX_cD_\alpha$ (0.90≤a≤1.8, 0≤b≤0.5, 0≤c≤0.05, 0<α≤2); $Li_aNi_{1-b-c}Co_bX_cO_{2-\alpha}T_\alpha$ (0.90≤a≤1.8, 0≤b≤0.5, 0≤c≤0.05, 0≤α≤2); $Li_aNi_{1-b-c}Co_bX_cO_{2-\alpha}T_2$ (0.90≤a≤1.8, 0≤b≤0.5, 0≤c≤0.05, 0≤α≤2); $Li_aNi_{1-b-c}Mn_bX_cD_\alpha$ (0.90≤a≤1.8, 0≤b≤0.5, 0≤c≤0.05, 0≤α≤2); $Li_aNi_{1-b-c}Mn_bX_cO_{2-\alpha}T_\alpha$ (0.90≤a≤1.8, 0≤b≤0.5, 0≤c≤0.05, 0≤α≤2); $Li_aNi_{1-b-c}Mn_bX_cO_{2-\alpha}T_2$ (0.90≤a≤1.8, 0≤b≤0.5, 0≤c≤0.05, 0≤α≤2); $Li_aNi_bE_cG_dO_2$ (0.90≤a≤1.8, 0≤b≤0.9, 0≤c≤0.5, 0.001≤d≤0.1); $Li_aNi_bCo_cMn_dG_eO_2$ (0.90≤a≤1.8, 0≤b≤0.9, 0≤c≤0.5, 0≤d≤0.5, 0.001≤e≤0.1); $Li_aNiG_bO_2$ (0.90≤a≤1.8, 0.001≤b≤0.1); $Li_aCoG_bO_2$ (0.90≤a≤1.8, 0.001≤b≤0.1); $Li_aMn_{1-b}G_bO_2$ (0.90≤a≤1.8, 0.001≤b≤0.1); $Li_aMn_2G_bO_4$ (0.90≤a≤1.8, 0.001≤b≤0.1); $Li_aMn_{1-g}G_gPO_4$ (0.90≤a≤1.8, 0≤g≤0.5); $QO_2$; $QS_2$; $LiQS_2$; $V_2O_5$; $LiV_2O_5$; $LiZO_2$; $LiNiVO_4$; $Li_{(3-f)}J_2(PO_4)_3$ (0≤f≤2); $Li_{(3-f)}Fe_2(PO_4)_3$ (0≤f≤2); and $LiFePO_4$.

In the above Chemical Formulae, A is selected from Ni, Co, Mn, or a combination thereof; X is selected from Al, Ni, Co, Mn, Cr, Fe, Mg, Sr, V, a rare earth element, or a combination thereof; D is selected from O, F, S, P, or a combination thereof; E is selected from Co, Mn, or a combination thereof; T is selected from F, S, P, or a combination thereof; G is selected from Al, Cr, Mn, Fe, Mg, La, Ce, Sr, V, or a combination thereof; Q is selected from Ti, Mo, Mn, or a combination thereof; Z is selected from Cr, V, Fe, Sc, Y, or a combination thereof; and J is selected from V, Cr, Mn, Co, Ni, Cu, or a combination thereof.

In some embodiments, the lithium metal oxide may be lithium nickel cobalt manganese oxide, lithium nickel cobalt aluminum oxide, or a combination thereof, and in some embodiments, a mixture of the lithium nickel cobalt manganese oxide and the lithium nickel cobalt aluminum oxide may be used.

In addition to the positive active material, the positive active material layer may further include a binder and a conductive material.

In some embodiments, the binder improves binding properties of the positive active material particles with each other, and of the positive active material with a positive current collector. Non-limiting examples of the binder include polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, or the like, but is not limited thereto.

In some embodiments, the conductive material improves conductivity of an electrode. Any electrically conductive material may be used as a conductive material, if it does not cause a chemical change in the battery. Non-limiting examples of the conductive material include a carbon-based material such as natural graphite, artificial graphite, carbon black, acetylene black, ketjen black, a carbon fiber, or the like; a metal-based material such as a metal powder or a metal fiber or the like of copper, nickel, aluminum, silver, or the like; a conductive polymer of a polyphenylene derivative or the like; or a mixture thereof.

In some embodiments, the negative electrode includes a negative current collector and a negative active material layer positioned on the negative current collector.

The negative current collector may use a copper foil.

The negative active material layer may include a negative active material, a binder, and optionally a conductive material.

The negative active material may include a material that reversibly intercalates/deintercalates lithium ions, a lithium metal, a lithium metal alloy, a material being capable of doping and dedoping lithium, or transition metal oxide.

The material that reversibly intercalates/deintercalates lithium ions may be a carbon material which is any carbon-based negative active material suitable for use in a rechargeable lithium battery, and non-limiting examples thereof include crystalline carbon, amorphous carbon, or a mixture thereof. Non-limiting examples of the crystalline carbon include graphite such as amorphous, sheet-shape, flake, spherical shape or fiber-shaped natural graphite or artificial graphite, and non-limiting examples of the amorphous carbon may be soft carbon or hard carbon, a mesophase pitch carbonized product, fired coke, or the like.

The lithium metal alloy may be an alloy of lithium and a metal selected from Na, K, Rb, Cs, Fr, Be, Mg, Ca, Sr, Si, Sb, Pb, In, Zn, Ba, Ra, Ge, Al, and Sn.

The material being capable of doping and dedoping lithium may be Si, $SiO_x$ ($0<x<2$), a Si—C composite, a Si-Q alloy (wherein Q is an alkali metal, an alkaline-earth metal, at least one of Group 13 to 16 elements, a transition metal, a rare earth element or a combination thereof, and not Si), Sn, $SnO_2$, a Sn—C composite, Sn—R (wherein R is an alkali metal, an alkaline-earth metal, at least one of Group 13 to 16 elements, transition metal, a rare earth element, or a combination thereof, and not Sn), or the like, and at least one of these materials may be mixed with $SiO_2$. Non-limiting examples of the Q and R include Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, or a combination thereof.

The transition metal oxide may be vanadium oxide, lithium vanadium oxide, or the like.

In some embodiments, the binder improves binding properties of the electrode active material and the acrylonitrile-based resin with each other, and the of electrode active material and the acrylonitrile-based resin with a negative current collector. The binder includes a non-water-soluble binder, a water-soluble binder, or a combination thereof. The non-water-soluble binder includes polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof. The water-soluble binder includes a styrene-butadiene rubber, an acrylated styrene-butadiene rubber, polyvinyl alcohol, sodium polyacrylate, a copolymer of propylene and a C2 to C8 olefin, a copolymer of (meth)acrylic acid and (meth)acrylic acid alkyl ester, or a combination thereof. When the water-soluble binder is used as a negative electrode binder, a cellulose-based compound may be further used to provide viscosity. The cellulose-based compound includes one or more of carboxylmethyl cellulose, hydroxypropylmethyl cellulose, methyl cellulose, or alkali metal salts thereof. The alkali metal may be Na, K, or Li. The cellulose-based compound may be included in an amount of about 0.1 parts to about 3 parts by weight based on 100 parts by weight of the negative active material.

In some embodiments, the conductive material improves conductivity of an electrode. Any electrically conductive material may be used as a conductive material, unless it causes a chemical change in the battery. Non-limiting examples of the conductive material include a carbon-based material such as natural graphite, artificial graphite, carbon black, acetylene black, ketjen black, a carbon fiber, or the like; a metal-based material such as a metal powder or a metal fiber or the like of copper, nickel, aluminum, silver, or the like; a conductive polymer such a polyphenylene derivative or the like; or a mixture thereof.

The negative electrode may be manufactured by mixing the negative active material, the binder and the conductive material in a solvent to prepare a negative active material composition, and applying the negative active material composition on the negative current collector. Herein, the solvent may be N-methylpyrrolidone or the like, but is not limited thereto.

In some embodiments, the electrolyte includes a non-aqueous organic solvent and a lithium salt.

The non-aqueous organic solvent may serve as a medium for transmitting ions taking part in the electrochemical reaction of the battery. The non-aqueous organic solvent may be selected from a carbonate-based, ester-based, ether-based, ketone-based, alcohol-based, or aprotic solvent.

The carbonate-based solvent may include, for example, dimethyl carbonate (DMC), diethyl carbonate (DEC), dipropyl carbonate (DPC), methylpropyl carbonate (MPC), ethylpropyl carbonate (EPC), methylethyl carbonate (MEC), ethylmethyl carbonate (EMC), ethylene carbonate (EC), propylene carbonate (PC), butylene carbonate (BC), or the like.

In the embodiments where the linear carbonate compounds and cyclic carbonate compounds are mixed, an organic solvent having a high dielectric constant and low viscosity can be obtained. In some embodiments, the cyclic carbonate and the linear carbonate are mixed together in a volume ratio ranging from about 1:1 to about 1:9.

In addition, the ester-based solvent may be, for example, methylacetate, ethylacetate, n-propylacetate, dimethylacetate, methylpropionate, ethylpropionate, γ-butyrolactone, decanolide, valerolactone, mevalonolactone, caprolactone, or the like. The ether-based solvent may be, for example, dibutylether, tetraglyme, diglyme, dimethoxyethane, 2-methyltetrahydrofuran, tetrahydrofuran, or the like, and the ketone-based solvent may be cyclohexanone, or the like. In addition, the alcohol-based solvent may be ethanol, isopropyl alcohol, or the like.

The non-aqueous organic solvent may be used alone or in a mixture, and when the organic solvent is used in a mixture, the mixture ratio may be controlled in accordance with a desirable battery performance.

The electrolyte may further include an overcharge inhibitor additive such as ethylenecarbonate, pyrocarbonate, or the like.

In some embodiments, the lithium salt dissolved in an organic solvent supplies lithium ions in a battery, improves lithium ion transportation between positive and negative electrodes therein, and basically operates the rechargeable lithium battery.

Non-limiting examples of the lithium salt include $LiPF_6$, $LiBF_4$, $LiSbF_6$, $LiAsF_6$, $LiN(SO_3C_2F_5)_2$, $LiC_4F_8SO_3$, $LiClO_4$, $LiAlO_2$, $LiAlCl_4$, $LiN(C_xF_{2x+1}SO_2)(C_yF_{2y+1}SO_2)$, wherein, x and y are natural numbers, LiCl, LiI, $LiB(C_2O_4)_2$ (lithium bis(oxalato) borate, LiBOB), or a combination thereof.

The lithium salt may be used in a concentration ranging from about 0.1 M to about 2.0 M. When the lithium salt is included within the above concentration range, an electrolyte may have excellent performance and lithium ion mobility due to optimal electrolyte conductivity and viscosity.

Hereinafter, the embodiments are illustrated in more detail with reference to examples. However, these examples are exemplary, and the present disclosure is not limited thereto.

Furthermore, what is not described in this disclosure may be sufficiently understood by those who have knowledge in this field and will not be illustrated here.

Example 1

Manufacture of Positive Electrode 98 wt % of $LiCoO_2$, 1 wt % of carbon black, and 1 wt % of polyvinylidene fluoride were added to an N-methylpyrrolidone (NMP) solvent, preparing a slurry. The slurry was coated on an aluminum (Al) thin foil and then, dried and roll-pressed, manufacturing a positive electrode.

Manufacture of Negative Electrode 98 wt % of graphite, 1 wt % of a styrene-butadiene rubber (SBR), and 1 wt % of carboxylmethyl cellulose (CMC) were added to a water solvent, preparing a slurry. The slurry was coated on a copper foil and then, dried and roll-pressed, manufacturing a negative electrode.

Manufacture of Separator 97.5 wt % of an acryl-based polymer (FA016A, Asahi Inc.) along with 2.5 wt % of a styrene-butadiene rubber (SBR) was mixed with water, preparing an organic layer composition.

95 wt % of AlO(OH) having a particle size of 0.6 µm along with 5 wt % of a styrene-butadiene rubber (SBR) was mixed with water, preparing an inorganic layer composition.

The inorganic layer composition was coated to form an inorganic layer on one side of a first polyethylene substrate having a pore size ranging from 0.1 µm to 1 µm, manufacturing a first separator.

A second separator was manufactured by coating the inorganic layer composition to form an inorganic layer on one side of a second polyethylene substrate having a pore size ranging from 0.1 µm to 1 µm, and coating the organic layer composition to form an organic layer on both sides of the second polyethylene substrate having the inorganic layer.

Herein, the first and the second substrates were each 9 µm thick, the inorganic layers formed on one side of the first and the second substrates were each 5 µm thick, and the organic layer was 2 µm thick.

Preparation of Electrolyte

An electrolyte solution was prepared by mixing ethylene carbonate, ethylmethyl carbonate, and dimethyl carbonate in a volume ratio of 2:4:4 and adding 1.15 M $LiPF_6$ to the mixture.

Manufacture of Rechargeable Lithium Battery Cell

The positive electrode, the first separator, the negative electrode, and the second separator were sequentially stacked to manufacture an electrode assembly, and the electrolyte solution was injected therein, manufacturing a rechargeable lithium battery cell. Herein, as for the first separator, the inorganic layer on one side of the first substrate was positioned to face the positive electrode, and as for the second separator, the inorganic layer on one side of the second substrate was positioned to face the negative electrode as shown in FIG. 3, manufacturing a rechargeable lithium battery cell.

Example 2

A rechargeable lithium battery cell was manufactured according to the same method as in Example 1 except for using a first polyethylene separator having a pore size ranging from 0.1 µm to 1 µm instead of the first separator according to Example 1.

Comparative Example 1

A rechargeable lithium battery cell was manufactured according to the same method as in Example 1 except for using the following method for manufacturing the separator and the rechargeable lithium battery cell:

The first separator was manufactured by coating the inorganic layer to form an inorganic layer on one side of a first polyethylene substrate having a pore size ranging from 0.1 µm to 1 µm, and coating the organic layer composition on both sides of the first substrate having the inorganic layer.

A second separator was manufactured by coating the inorganic layer composition on one side of a second polyethylene substrate having a pore size ranging from 0.1 µm to 1 µm to form an inorganic layer and then, coating the organic layer composition to form an organic layer on both sides of the second substrate having the inorganic layer.

The positive electrode, the first separator, the negative electrode, and the second separator were sequentially stacked to manufacture an electrode assembly, and the electrolyte solution was injected therein, manufacturing a rechargeable lithium battery cell. Herein, as for the first separator, the inorganic layer on one side of the first substrate was positioned to face the positive electrode, and as for the second separator, the inorganic layer on one side of the second substrate was positioned to also face the positive electrode, manufacturing a rechargeable lithium battery cell.

Comparative Example 2

A rechargeable lithium battery cell was manufactured according to the same method as in Example 1 except for using the following method for manufacturing the separator and the rechargeable lithium battery cell:

A first separator was manufactured by coating the inorganic layer composition on a first polyethylene substrate having a pore size ranging from 0.1 μm to 1 μm to form an inorganic layer. In addition, a second polyethylene separator having a pore size ranging from 0.1 μm to 1 μm and not coated with either an inorganic or an organic layer was used.

The positive electrode, the first separator, the negative electrode, and the second separator were sequentially stacked to manufacture an electrode assembly, and the electrolyte solution was injected therein, manufacturing a rechargeable lithium battery cell. Herein, as for the first separator, the inorganic layer on one side of the first substrate was positioned to face the positive electrode, manufacturing a rechargeable lithium battery cell.

Evaluation 1: Thickness of Electrode Assembly

The thicknesses of the electrode assemblies according to Examples 1 and 2, and Comparative Examples 1 and 2 were measured by using a height gauge, and the results are provided in the following Table 1.

Evaluation 2: Strength of Electrode Assembly

In order to measure strength of the electrode assemblies according to Examples 1 and 2 and Comparative Examples 1 and 2, a compression limit test was performed by using a universal testing machine (AMETEK, LLOYD Instruments), and the results are provided in the following Table 1.

Evaluation 3: Swelling of Rechargeable Lithium Battery after Charge

The rechargeable lithium battery cells according to Examples 1 and 2 and Comparative Examples 1 and 2 were charged under the following conditions and then, decomposed to evaluate their expansion degree after the charge, each thickness change of the positive and negative electrodes and the separator was measured, and the results are provided in the following Table 1.

Charge condition: CC-CV/4.35V/0.5 C/0.1 C cut-off
Discharge condition: CC/1.0 C/3.5V cut-off

TABLE 1

| | | Example 1 | Example 2 | Comparative Example 1 | Comparative Example 2 |
|---|---|---|---|---|---|
| Thickness of electrode assembly (mm) | | 4.10 | 4.13 | 3.94 | 4.54 |
| Strength of electrode assembly (KN/m) | | 9.5 | 8.7 | 311 | 10 |
| Thickness variation ratio after charge (%) | Electrode assembly | 2.78 | 3.4 | 5.70 | 8.7 |
| | Positive electrode | 7.6 | 8.2 | 9.3 | 9.1 |
| | Negative electrode | 22.5 | 24.1 | 22.5 | 24.2 |
| | First separator | 0 | 0 | 6.25 | 6.5 |
| | Second separator | 6.25 | 6 | 6.25 | 0 |

Referring to Table 1, Examples 1 and 2 using a separator having adherence and another separator having no adherence and positioning at least one inorganic layer to face a negative electrode may not only realize a thin rechargeable lithium battery cell, but also may minimize expansion of the battery cell after the charge and may sharply decrease strength of the battery cell, thus improving safety of the battery cell.

On the other hand, Comparative Example 1 using two separators having adherence may not secure safety of a battery cell due to battery expansion after the charge and high strength of the battery cell, and Comparative Example 2 using separator having no adherence may not be good for use due to initial thick thickness as well as battery expansion after the charge.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A rechargeable lithium battery, comprising
an electrode assembly comprising a positive electrode, a first separator, a negative electrode, and a second separator that are sequentially stacked and wound,
wherein the first separator comprises a first substrate including a first side facing the positive electrode and a second side facing the negative electrode,
the second separator comprises a second substrate including a third side facing the negative electrode and a fourth side opposite the third side and facing the positive electrode when the electrode assembly is wound, and
wherein at least one organic layer comprising an organic material different from the substrate as a major component is positioned on at least one selected from the first side and the second side or is positioned on at least one selected from the third side and the fourth side, and
at least one inorganic layer comprising an inorganic material as a major component is positioned on at least one selected from the second side and the third side,
wherein the at least one organic layer is distinct from the at least one inorganic layer.

2. The rechargeable lithium battery of claim 1, wherein the organic layer is positioned on at least one selected from the third side and the fourth side, and
the inorganic layer is positioned on the third side.

3. The rechargeable lithium battery of claim 1, wherein the organic layer is positioned on at least one selected from the third side and the fourth side, and
an inorganic layer is positioned on each of the first side and the third side.

4. The rechargeable lithium battery of claim 1, wherein the organic layer is positioned on at least one selected from the third side and the fourth side, and
an inorganic layer is positioned on each of the second side and the third side.

5. The rechargeable lithium battery of claim 1, wherein the organic layer is positioned on at least one selected from the third side and the fourth side, and
an inorganic layer is positioned on each of the second side and the fourth side.

6. The rechargeable lithium battery of claim 1, wherein the first substrate and the second substrate each comprise pores having a size of about 0.01 μm to about 1 μm.

7. The rechargeable lithium battery of claim 1, wherein the first substrate and the second substrate each comprise polyolefin-based resin.

8. The rechargeable lithium battery of claim 1, wherein each of the first substrate and the second substrate has a thickness of about 6 μm to about 25 μm.

9. The rechargeable lithium battery of claim 1, wherein the organic material comprises particles having adhesive properties and selected from polyolefins, polyolefin derivatives, polyolefin wax, acryl-based polymers, or combinations thereof.

10. The rechargeable lithium battery of claim 9, wherein a weight average molecular weight of the organic material is from about 300 to about 10,000 g/mol.

11. The rechargeable lithium battery of claim 9, wherein the organic material has a particle size of about 100 nm to about 5 μm.

12. The rechargeable lithium battery of claim 1, wherein the organic material is included in an amount of about 1 part by weight to about 80 parts by weight based on 100 parts by weight of the first substrate when the organic layer is positioned on at least one selected from the first side and the second side, and the organic material is included in an amount of about 1 part by weight to about 80 parts by weight based on 100 parts by weight of the second substrate when the organic layer is positioned on at least one selected from the third side and the fourth side.

13. The rechargeable lithium battery of claim 1, wherein the organic layer has a thickness of about 1 μm to about 6 μm.

14. The rechargeable lithium battery of claim 1, wherein the organic layer further comprises a binder that is different from the organic material.

15. The rechargeable lithium battery of claim 14, wherein the binder comprises a styrene-butadiene rubber (SBR), carboxylmethyl cellulose (CMC), polyvinylidene fluoride (PVdF), a polyvinylidene fluoride-hexafluoropropylene (PVdF-HFP) copolymer, ethylene vinylacetate (EVA), hydroxyethyl cellulose (HEC), polyvinyl alcohol (PVA), polyvinylbutyral (PVB), an ethylene-acrylic acid copolymer, acrylonitrile, a vinyl acetate derivative, polyethylene glycol, an acryl-based rubber, or a combination thereof.

16. The rechargeable lithium battery of claim 1, wherein the inorganic material comprises $SiO_2$, $Al_2O_3$, $Al(OH)_3$, $AlO(OH)$, $TiO_2$, $BaTiO_2$, $ZnO_2$, $Mg(OH)_2$, $MgO$, $Ti(OH)_4$, $ZrO_2$, aluminum nitride, silicon carbide, boron nitride, or a combination thereof.

17. The rechargeable lithium battery of claim 1, wherein the inorganic material has a particle size of about 0.1 μm to about 5 μm.

18. The rechargeable lithium battery of claim 1, wherein the inorganic material is included in an amount of about 20 parts by weight to about 200 parts by weight based on 100 parts by weight of the first substrate when the inorganic layer is positioned on at least one selected from the first side and the second side, and the inorganic material is included in an amount of about 20 parts by weight to about 200 parts by weight based on 100 parts by weight of the second substrate when the inorganic layer is positioned on at least one selected from the third side and the fourth side.

19. The rechargeable lithium battery of claim 1, wherein the inorganic layer has a thickness of about 0.5 μm to about 7 μm.

20. The rechargeable lithium battery of claim 1, wherein the inorganic layer further comprises a binder.

* * * * *